United States Patent [19]

Weisz

[11] Patent Number: 4,918,284
[45] Date of Patent: Apr. 17, 1990

[54] CALIBRATING LASER TRIMMING APPARATUS

[75] Inventor: John R. Weisz, Somerville, Mass.

[73] Assignee: Teradyne Laser Systems, Inc., Somerville, Mass.

[21] Appl. No.: 258,152

[22] Filed: Oct. 14, 1988

[51] Int. Cl.$^4$ ............................................. B23K 26/00
[52] U.S. Cl. ........................... 219/121.78; 219/121.69; 219/121.8; 219/121.83
[58] Field of Search ...................... 219/121.78, 121.67, 219/121.72, 121.63, 121.64, 121.76, 121.8, 121.82, 121.83; 356/400, 401

[56] References Cited

U.S. PATENT DOCUMENTS 4,769,523  9/1988  Tanimoto et al. .......... 219/121.76 X

OTHER PUBLICATIONS

Wells et al., "A Technique for Automatic Focusing and Alignment of Monolithic Circuits for Laser Trimming," Third Annual Microelectronics Measurement Technology Seminar Proceedings (Mar. 17–18, 1981, San Jose, CA).

Primary Examiner—C. L. Albritton
Attorney, Agent, or Firm—Fish & Richardson

[57] ABSTRACT

A laser trimming apparatus calibration system including controlling a laser beam positioning mechanism to move a laser beam to a desired nominal laser position, imprinting a mark on a medium to establish an actual laser position, comparing the imprinted mark with the desired nominal position and producing a result indicative of the difference between the actual position and the desired nominal position. The system further including providing an illuminated mark at a desired illuminated mark nominal position, controlling the laser beam positioning mechanism to direct an optical path to the desired illuminated mark position, establishing an actual illuminated mark position by directing light from the desired illuminated mark nominal position along the optical path to the detection device and comparing the actual illuminated mark position with the nominal illuminated mark position.

20 Claims, 7 Drawing Sheets

CALIBRATING LASER TRIMMING APPARATUS

BACKGROUND OF THE INVENTION

The present invention relates to calibrating laser trimming apparatus.

Laser trimmers are used to trim electrical components (e.g., resistors, capacitors or conductors) on semiconductor wafers used in integrated circuits. They typically employ a laser beam source, a laser beam positioning mechanism which directs the beam to a desired location on the semiconductor workpiece using mirrors that are precisely moved by galvanometers or x-y stage, and a lens, which focuses the beam.

Wells et al., "A Technique for Automatic Focusing and Alignment of Monolithic Circuits for Laser Trimming," *Third Annual Microelectronics Measurement, Technology Seminar Proceedings* (Mar. 17–18, 1981 San Jose, CA) discloses calibrating the positioning of a beam by moving a laser beam over a surface that is marked at known locations in a manner that affects reflectance of the beam and measuring the beam's reflectance at various galvanometer positions associated with nominal positions on the workpiece, using a photodetector that receives part of the reflectance back through the optical path.

As used herein, "nominal laser position" means the desired position of the laser on the workpiece; it is the position to which the laser beam positioning mechanism is instructed to place the laser. "Actual position" means the actual position of the laser on the workpiece.

SUMMARY OF THE INVENTION

It has been discovered that laser trimming apparatus can be advantageously calibrated by controlling a laser beam positioning mechanism to move a laser beam to a desired nominal laser position on a workpiece region, imprinting a mark (e.g., cutting a line) on a medium to establish an actual laser position, scanning the imprinted mark to detect an actual laser position, and comparing the actual laser position with the desired nominal position.

In preferred embodiments, the laser beam operates on one wavelength, and the mark is scanned with a detection device that operates on a different wavelength; the detection device views a field that covers a portion of the overall workpiece region, and determines the position of a mark within the field; the laser beam is moved to and calibrated at a plurality of positions within the workpiece region; the system operates over two perpendicular axes; there is generation of a function that describes the relationship between the nominal position and the actual position; and the function accurately describes the relationship between the actual position and the nominal position over the entire workpiece region; and the laser trimming apparatus is additionally calibrated by providing an illuminated mark (e.g., a reference grid) at a second wavelength, controlling the laser beam positioning mechanism so as to direct an optical path to a desired illuminated mark nominal position, establishing an actual illuminated mark position by directing light from the nominal position along the optical path to a detection device and comparing the actual illuminated mark position with the desired nominal illuminated mark position.

In another aspect, the invention involved advantageously determining where a beam position is in relation to a camera field of view by controlling a laser beam positioning mechanism to move a laser beam to a desired nominal laser position on a workpiece region, imprinting a mark on a medium to establish an actual laser position, scanning the imprinted mark to detect an actual laser position, comparing the actual position with the desired nominal position and determining the beam position based on the comparing.

Other advantages and features of the invention will be apparent from the following description of a preferred embodiment thereof and from the claims.

DESCRIPTION OF THE PREFERRED EMBODIMENT

I first briefly describe the drawings.

DRAWINGS

STRUCTURE

Figure 1:
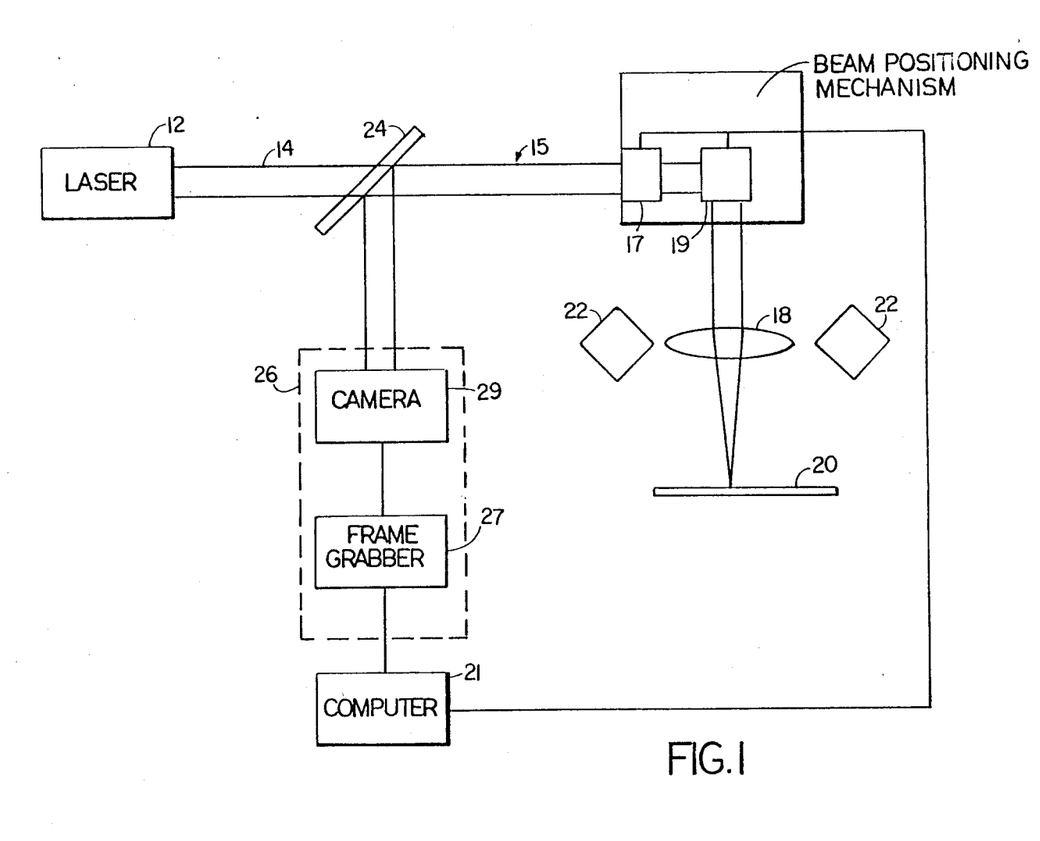
FIG. 1 is a block-diagram of laser trimming apparatus according to the invention.
Figure 1A:
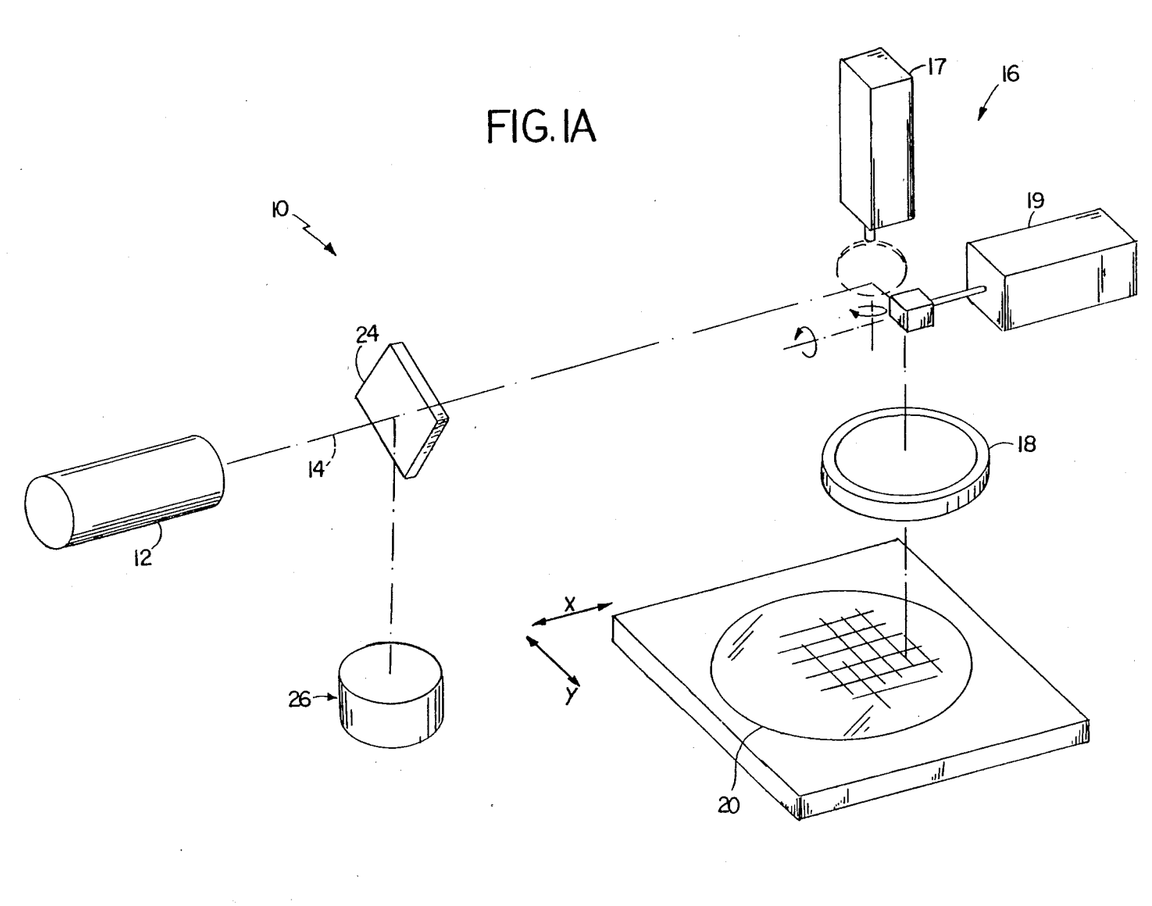
FIG. 1A shows a diagrammatic, perspective view of components of the FIG. 1 system.

Referring to FIG. 1, laser trimming apparatus 10 includes infrared laser 12 (having a wavelength of 1064 nm and available from Quantronix), which outputs laser beam 14 along optical path 15 to and through laser beam positioning mechanism 16 to workpiece region 20. Laser beam positioning mechanism 16, includes a pair of mirrors and attached respective galvanometers 17, 19 (available from General Scanning under the trade designation Z619). Beam positioning mechanism 16 directs laser beam 14 through lens 18 (a nontelecentric, achromatized at two frequencies, 10-inch focal length lens manufactured by Melles-Griot) to workpiece region 20, having a field size of 4000×4000 mils broken down into four quadrants by x and y coordinate axes (each axis having locations from −2000 to +2000). Laser beam positioning mechanism 16 moves laser beam 14 along two perpendicular axes thereby providing two dimensional positioning of laser beam 12, across workpiece region 20. Each mirror and associated galvanometer 17, 19 moves the beam along its respective x or y axis under control of computer 21. Each galvanometer can move its respective mirror through $2^{16}$ distinct angular positions when causing beam 12 to move 4,000 mils across region 20. Illumination devices 22 are yellow halogen lights that produce visible light having a narrow bandwidth to illuminate workpiece region 20.

Beam splitter 24 (a partially reflective mirror) is located within optical path 15 to direct light energy reflected back along path 15 from workpiece region 20 to detection device 26. Detection device 26 includes television camera 29, and associated frame grabber 27, which digitizes the video input from television camera 29 to obtain pixel data representing a two-dimensional image of a portion of workpiece region 20. The pixel data are stored in a memory of frame grabber 27.

Camera 29 has a 110 mil×160 mil field of view, and frame grabber 27 has an associated 480×520 pixel array. Each pixel is assigned a 8-bit intensity value. Computer 21 analyzes the pixel data to determine where a mark (e.g., a line) in the workpiece region 20 is located. E.g., when determining the location of the vertical line, computer 21 takes the first derivative of pixel data along a horizontal row. The derivative shows where the change in intensity has the greatest, thereby showing the two edges of the actual line of interest.

OPERATION

Referring to FIG. 1, the position of the laser beam 14 on workpiece region 20 is controlled along two axes by beam positioning mechanism 16. Beam positioning mechanism 16 moves beam 14 a plurality of distinct angles that correspond to linear distances called "beam steps" along the workpiece surface. The average beam step size is the average resolution, which is given by equation 1:

$$\text{Resolution} = \text{workpiece region width} / \text{number of beam steps along axis} \qquad (1)$$

The number of beam steps from the edge of the workpiece region required to position beam 12 to a nominal beam position in the −2000 to 2000 coordinate axis system equals the total number of beam steps (4000) divided by two (to set beam 12 to the center of workpiece region 20) plus the desired position divided by the resolution. (See equation 2.)

$$\text{Steps} = (\text{total steps})/2 + \text{desired position}/\text{resolution} \qquad (2)$$

Equation 2 applies to both the x and the y axes. This position is "nominal" because the actual beam position is different, owing to, e.g., linearity error due to the nonlinearity of the beam steps on work piece region 20 with respect to angular steps of the galvanometer, distortion error due to the distorting effects of the optical elements, and orthogonality error due to the galvanometers not being perfectly perpendicular to each other.

Figure 4A:
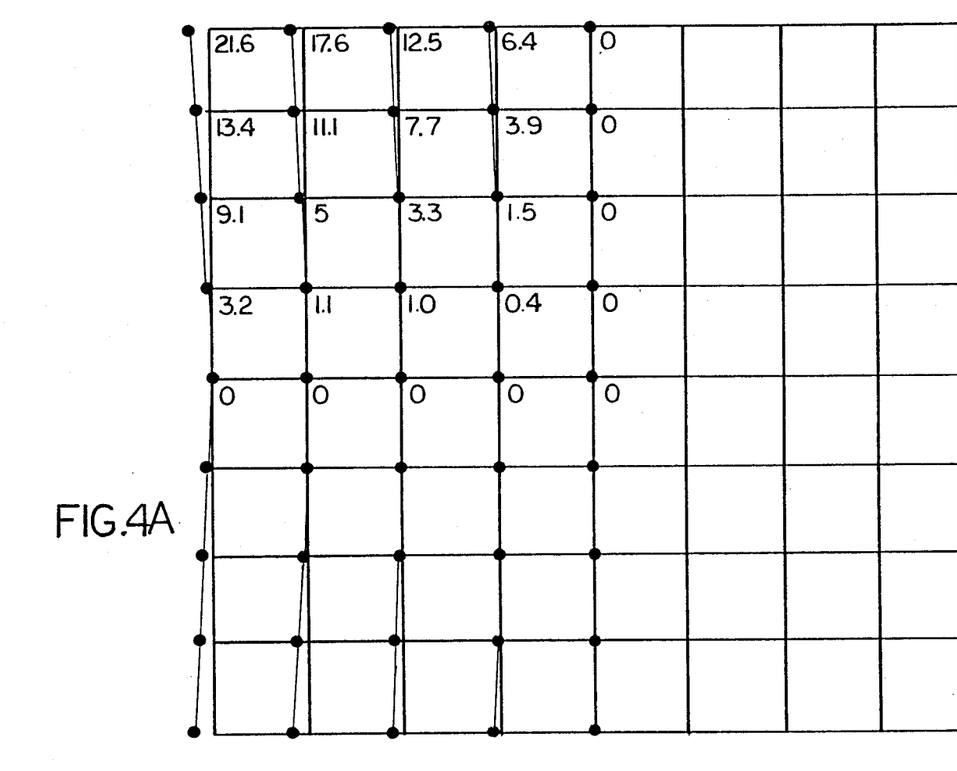
FIGS. 4A and 4B are diagrams illustrating positioning errors that are corrected by the invention.
Figure 4B:
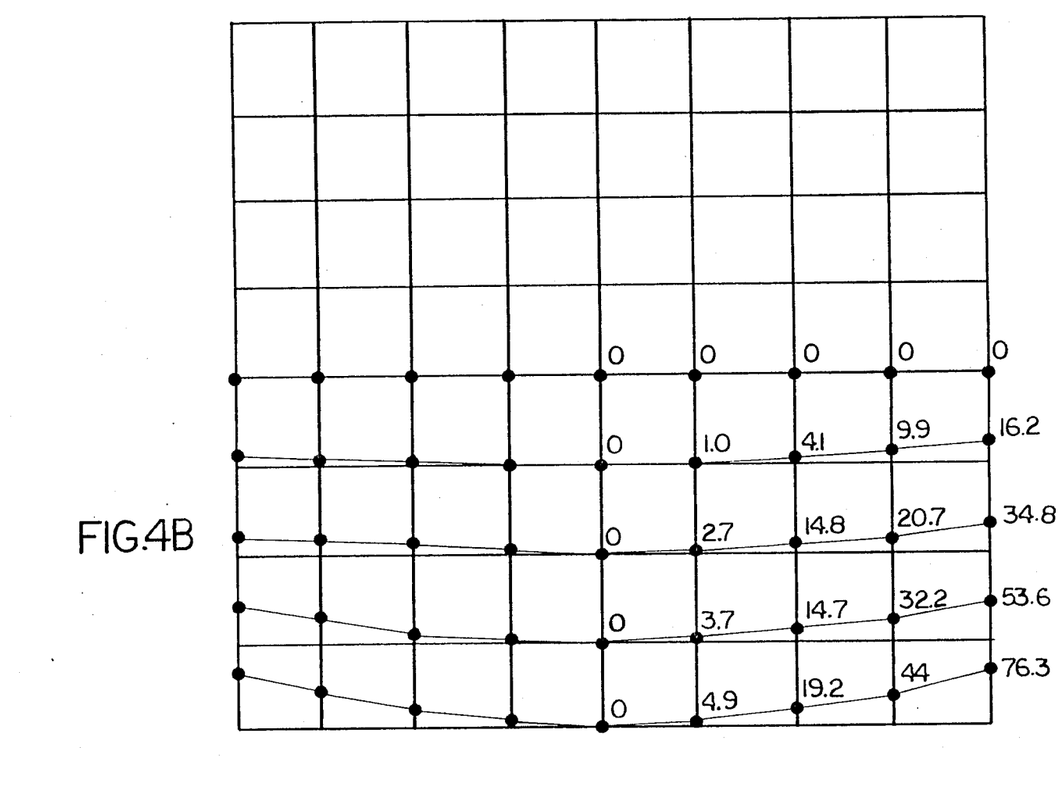

FIGS. 4A and 4B illustrate the differences between a 0.5 inch spaced grid of nominal positions and the actual positions. FIG. 4A shows the differences between the nominal and actual x values (assuming that the nominal y value equals the actual y value), and FIG. 4B shows the differences between the nominal and actual y values (assuming that the nominal x value equals the actual x value). The data of this example were averaged to be symmetric about both axes. The differences are in mils; and the opposite half of each field (not shown in the figures) is a mirror image of the half shown. In practice, the differences are not necessarily symmetric about the origin, nor are the errors at axis intersections necessarily zero.

The calibrating system according to the invention makes adjustments to remove the effects of these sources of error and provides accurate positioning over the whole field of the system. Additionally, because different wavelengths are used by laser 12 and detection device 26, which determines the actual position of the laser beam, refraction error due to the different paths of light of different wavelengths through the lens must also be corrected. Refraction errors offset actual positions from nominal positions by amounts which are substantially linear throughout the workpiece region.

Figure 2:
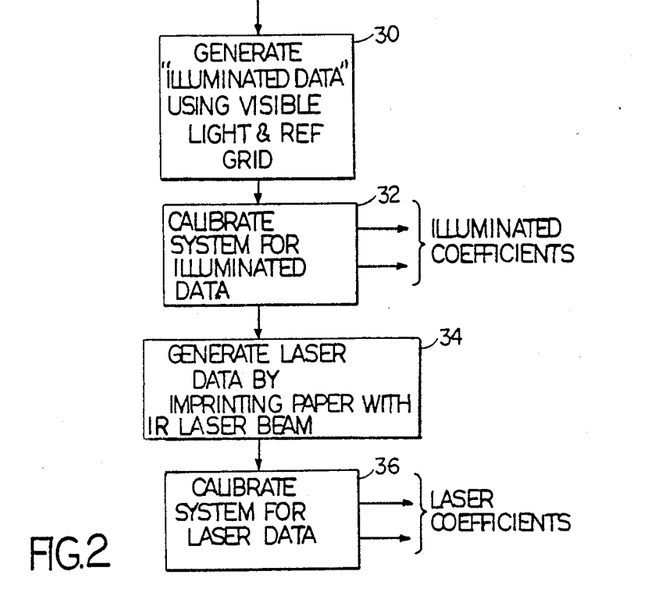
FIGS. 2 and 2A are flow charts describing a method of calibrating the FIG. 1 laser trimming appartus according to the invention.
Figure 2A:
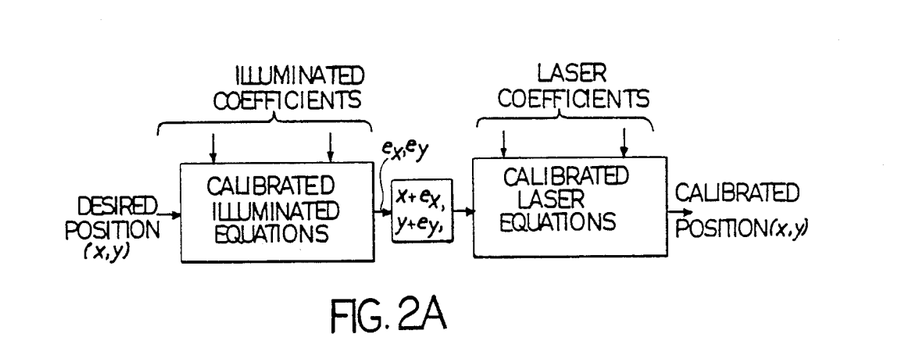

Referring to FIG. 2, a method of calibrating laser trimming apparatus 10 includes steps 30-36. Step 30 involves generating data used in calibrating the system using light energy having a first frequency, e.g., visible light. Step 32 involves calibrating apparatus 10 at the first frequency. Step 34 involves generating data used in calibrating the system for light energy at a second frequency, i.e., infrared. Step 36 involves calibrating apparatus 10 at the second frequency.

Figure 5:
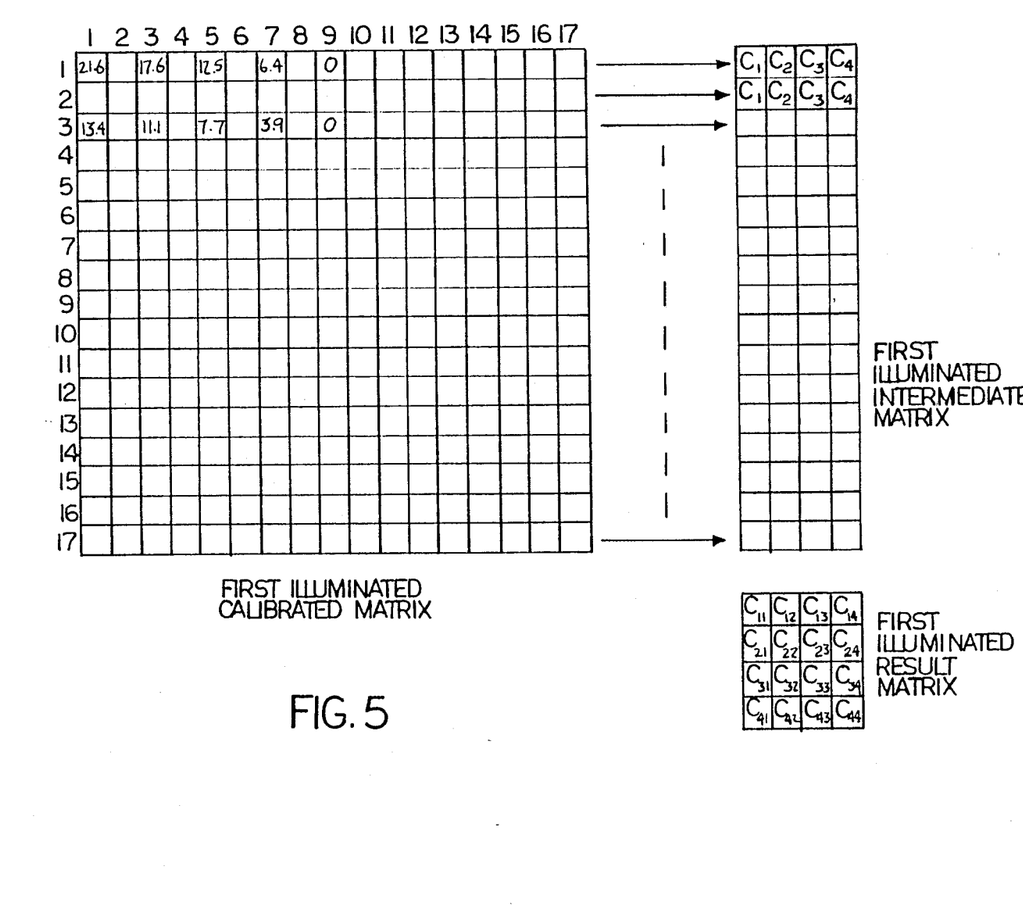
FIG. 5 is an illustration of data matrices of the FIG. 2 method.

In generating data step 30, a surface with vertical and horizontal etched lines precisely spaced every 250 mils is placed in position to act as a reference grid. The surface is illuminated with illumination devices 22; beam positioning mechanism 16 is adjusted to position optical path 15 to a nominal position on workpiece region 20; detection device 26 detects the difference along the x axis between the nominal position and the actual position of the optical path, and this information is stored in computer 21. Beam positioning mechanism 16 is adjusted to a new nominal position (one galvanometer (the x galvanometer) is stationary while the other galvanometer (the y galvanometer) is moved) and detection device 26 detects a new actual position. Measurements are made for fifteen more nominal positions to generate data along a first vertical line; then the x galvanometer is moved, and data along a second vertical line are generated by adjusting the y galvanometer. These steps are repeated until a first 17×17 illuminated calibration matrix of data is generated for differences along the x axis between the nominal positions and the actual positions. (E.g., FIG. 4A shows actual positions and the differences along the x axis between these positions and nominal positions for four lines of data and FIG. 5 shows an illustration of the first illuminated calibration matrix with data from FIG. 4A in respective locations.)

The differences between the nominal positions and the actual positions along the y axis are then determined in a similar manner. Beam positioning mechanism 16 is adjusted to move optical path 15 to a nominal position on the grid; detection device 26 detects the difference between the nominal position and the actual position of optical path 15 and stores this information in computer 21. Beam positioning mechanism 16 is then adjusted to a new nominal position along the horizontal axis by moving the x galvanometer while the y galvanometer remains stationary. Detection device detects the new actual position and stores this information in computer 21. Measurements are made for fifteen more nominal positions to generate data along a first horizontal line; then the y galvanometer is moved to a new position; data along a second horizontal line are generated by moving the x galvanometer and detecting the differences between the actual positions and the nominal positions. The steps are repeated until a second 17×17 illuminated calibration matrix of data is generated for differences along the y axis. (E.g. FIG. 4B shows differences along the y axis between actual positions and nominal positions for four lines of data).

In generating laser data step 34, laser 12 is activated, and beam positioning mechanism 16 moves laser beam 14 to a desired nominal position along one axis. Laser beam 14 then imprints a line on paper sensitive to laser light by holding one galvanometer stationary while the other galvanometer is moved. After a first line is finished, the stationary galvanometer is moved and then a new line is imprinted by adjusting the other galvanometer, and so on until 17 lines have been imprinted. Detection device 26 then scans these marks and detects the laser position differences between actual positions, as shown by the imprinted marks, and the desired nominal positions at predetermined points. These differences are stored in a 17×17 laser calibration matrix for a first axis, e.g., the x axis. As with step 30, this entire process is repeated for the other axis, e.g. the y axis, and a second 17×17 laser calibration matrix is generated.

In data generation steps 30, 34, the movements of the x and y galvanometers are controlled by computer 21. Because the field of view of camera 29 of detection device 26 is smaller than the 250 mil difference between nominal positions, computer 21 utilizes the difference of the previous measurement to adjust the amount a galvanometer is moved for the next measurement. E.g., if the difference of the previous measurement if +10 mils, then the galvanometer is instructed by computer 21 to move the position of the optical path 260 mils. In this way, the field of view of camera 29 is approximated to the next measurement location. Each galvanometer is moved 17 times for detection device 26 to detect positions at 17 points along a line of data.

Figure 3:
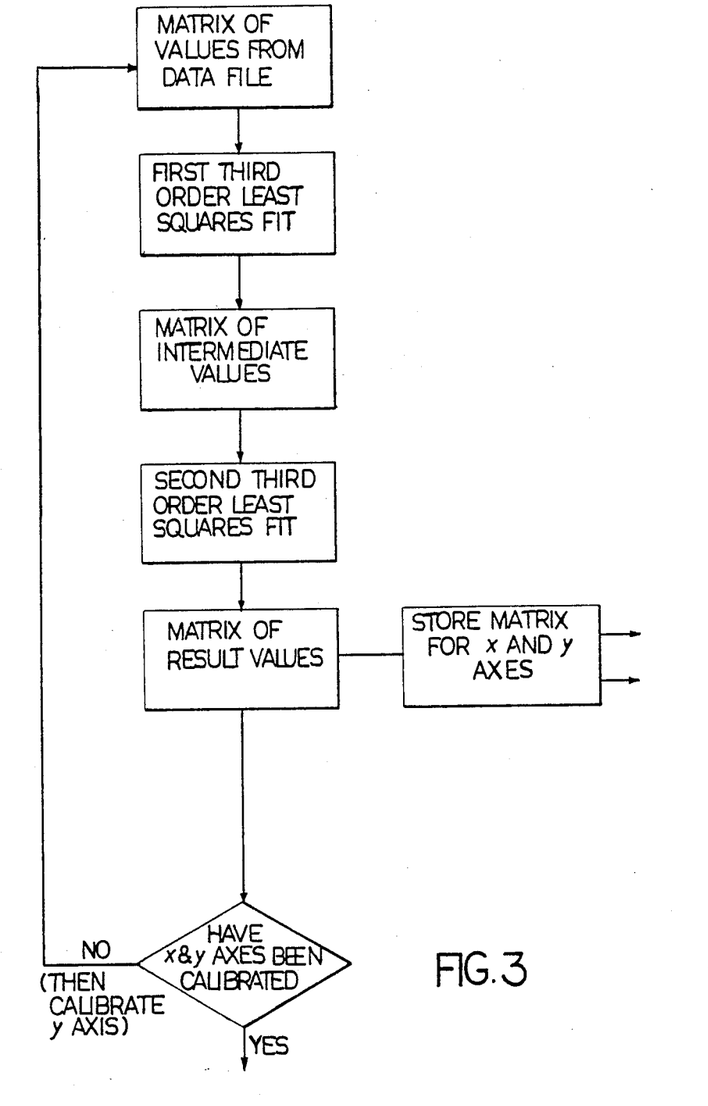
FIG. 3 is a flow chart describing a calibration step of the FIG. 2 method.

Referring to FIGS. 2 and 3, calibrating step 32 receives the first illuminated calibration matrix and performs a third order, least squares fit on the first row of the matrix to produce the following third order equation to describe the error, $E(x)$, i.e., the difference along the x axis between an actual position and a desired position:

$$E(x) = C_1 x + C_2 x^2 + C_3 x^3 + C_4 \tag{3}$$

where: $C_1$, $C_2$, $C_3$ and $C_4$ are coefficients determined by the least squares fit. This process is repeated for the remaining 16 rows of difference data of the first illuminated calibration matrix, generating 16 further sets of $C_1$, $C_2$, $C_3$, $C_4$ coefficients, which are placed with the first set as the values in a 4×17 first intermediate matrix. (See FIG. 5) Next a third order least squares fit of each column of the first intermediate matrix is performed, and the data outputted from this step are stored in a first 4×4 illuminated calibration result matrix, where the coefficients of the first column's third order fit are the matrix values $C_{11}$, $C_{12}$, $C_{13}$ and $C_{14}$ and the coefficients of the second column's third order fit are the matrix values $C_{21}$, $C_{22}$, $C_{23}$, and $C_{24}$, etc. The values in the result matrix provide the coefficients of a first two-dimensional, third order, least squares fit of the inputted data for errors along the x axis. Equation 4 is used to obtain $e_x(x,y)$, the difference between the actual position and a desired position along the x axis when inputted with the desired positions:

$$e_x(x,y) = F_1(y)x + F_2(y)x^2 + F_3(y)x^3 + F_4 \tag{4}$$

where:

$$F_1(y) = C_{11}y + C_{12}y^2 + C_{13}y^3 + C_{14} \tag{5}$$

$$F_2(y) = C_{21}y + C_{22}y^2 + C_{23}y^3 + C_{24} \tag{6}$$

$$F_3(y) = C_{31}y + C_{32}y^2 + C_{33}y^3 + C_{34} \tag{7}$$

$$F_4(y) = C_{41}y + C_{42}y^2 + C_{43}y^3 + C_{44} \tag{8}$$

Calibrating step 32 continues by receiving the second illuminated calibration matrix, and performing a third order, least squares fit on the first column of the matrix to produce the following third order equation to describe the error, $E(y)$, i.e., the difference along the y axis between an actual position and a desired position: (See equation 9)

$$E(y) = C'_1 y + C'_2 y^2 + C'_3 y^3 + C'_4 \tag{9}$$

where: $C'_1$, $C'_2$, $C'_3$, and $C'_4$ are coefficients determined by the least squares fit. This process is repeated for each column of the second illuminated calibration matrix, generating 16 further sets of $C'_1$, $C'_2$, $C'_3$, $C'_4$ coefficients, which are placed with the first set as the values of a 17×4 second intermediate matrix. Next, a third order least squares fit of each row of the second intermediate matrix is performed and the data outputted from this step are stored in a second 4×4 illuminated calibration result matrix, where the coefficients of the first row's third order fit are the matrix values $C'_{11}$, $C'_{12}$, $C'_{13}$ and $C'_{14}$ and the coefficients of the second row's third order fit are the matrix values $C'_{21}$, $C'_{22}$, $C'_{23}$ and $C'_{24}$, etc. The values in the result matrix provide the coefficients of a second two-dimensional, third order, least squares fit of the inputted data for errors along the y axis. Equation 10 is used to obtain $e_y(x,y)$, the difference between the actual position and a desired position along the y axis when inputted with the desired position:

$$e_y(x,y) = F'_1(x)y + F'_2(x)y^2 + F'_3(x)y^3 + F'_4 \tag{10}$$

where:

$$F'_1(y) = C'_{11}y + C'_{12}y^2 + C'_{13}y^3 + C'_{14} \tag{11}$$

$$F'_2(y) = C'_{21}y + C'_{22}y^2 + C'_{23}y^3 + C'_{24} \tag{12}$$

$$F'_3(y) = C'_{31}y + C'_{32}y^2 + C'_{33}y^3 + C'_{34} \tag{13}$$

$$F'_4(y) = C'_{41}y + C'_{42}y^2 + C'_{43}y^3 + C'_{44} \tag{14}$$

The steps of calibrating step 36 correspond to the steps of calibrating step 32. I.e., first and second 17×17 laser calibration matrices are inputted into calibration step 36 and first and second laser calibration equations (one for each perpendicular axis) are outputted.

Generating data step 34 and calibrating step 36 advantageously determine where a beam position is in relation to a camera field of view; i.e., the steps make apparatus 10 self-aligning. Thus, laser beam 14 need not be bore-sited to a known reference point with beam positioning mechanism 16.

In operation of laser trimming apparatus 10, x and y coordinates of a desired trimming position are used as the x and y inputs to the x and y axis illuminated calibration equations (equations 4 and 10, including the coefficients described in step 32), which outputs intermediate data, $e_x(x,y)$, $e_y(x,y)$ representing the difference between the desired trimming position and an actual visible trimming position at the desired trimming position x,y. The intermediate data are added to respective desired trimming position coordinates, the sums of which are inputted into respective x and y laser calibration equations (equations 4 and 10, including the coefficients described in step 36). The outputs of these equations are the calibrated trimming position coordinates. Upon providing the calibrated laser trimming position coordinates to laser beam positioning mechanism 16, a laser beam inputted to beam positioning mechanism 16 is directed to the desired trimming position. I.e., laser trimming apparatus is calibrated to compensate for the errors of the system, including those discussed above.

OTHER EMBODIMENTS

Other embodiments of the invention are within the scope of the following claims.

What is claimed is:

1. A method of calibrating laser trimming apparatus including a laser beam having a first wavelength, a laser beam positioning mechanism and a detection device using a second wavelength that is different from said wavelength, said detection device viewing a field and determining a mark position within said field, the method comprising, controlling said laser beam positioning mechanism so as to move said laser beam to a desired nominal laser position in a workpiece region, imprinting a mark on a medium with said laser to establish an actual laser position of said laser beam, scanning said imprinted mark with said detection device to determine said actual laser position of said imprinted mark, said scanning step involving using information indicating said mark position within said field, said scanning step including generating a two-dimensional pixel array related to said field and assigning each pixel of said pixel array an intensity value, and comparing said imprinted mark of said actual laser position with said desired nominal laser position and producing a result indicative of the difference between said actual laser position and said nominal laser position.

2. The method of claim 1 wherein said detection device includes a video camera.

3. The method of claim 1 wherein said scanning step further comprising taking a derivative of intensity values along an axis to determine said actual laser position.

4. The method of claim 1 further comprising, providing an illuminated mark at said second wavelength at a desired illuminated mark nominal position in said workpiece region, controlling said laser beam positioning mechanism so as to direct an optical path to said desired illuminated mark nominal position, establishing an actual illuminated mark position by directing light from said desired illuminated mark nominal position along said optical path through said laser beam positioning mechanism to said detection device, and comparing said actual illuminated mark position with said nominal illuminated mark position.

5. The method of claim 1 herein said detection device includes a video camera.

6. The method of claim 1 further comprising repeating said controlling, imprinting, scanning and comparing for a plurality of positions, and storing the results of said plurality of comparing steps.

7. The method of claim 6 further comprising generating a function that describes said results over said workpiece region.

8. The method of claim 7 wherein said laser beam positioning mechanism operates along two perpendicular axes.

9. The method of claim 8 wherein said function comprises a laser calibration equation, said laser calibration equation including the difference between said desired nominal laser position and said actual laser position.

10. A method of calibrating laser trimming apparatus including a laser beam having a first wavelength, a laser beam positioning mechanism, said laser beam positioning mechanism operating along two perpendicular axes, and a detection device using a second wavelength that is different from said first wavelength, the method comprising, controlling said laser beam positioning mechanism so as to move said laser beam to a desired nominal laser position in a workpiece region, imprinting a mark on a medium with said laser to establish an actual laser position of said laser beam, scanning said imprinted mark with said detection device to determine said actual laser position of said imprinted mark, comparing said imprinted mark of said actual laser position with said desired nominal laser position and producing a result indicative of the difference between said actual laser position and said nominal laser position, repeating said controlling, imprinting, scanning and comparing for a plurality of positions, storing the results of said plurality of comparing steps, and generating a function that describes said results over said workpiece region, said function including a laser calibration equation indicating the difference between said desired nominal laser position and said actual laser position, said equation being a two-dimensional, third order, least squares fit of said plurality of results.

11. The method of claim 4 further comprising repeating said controlling said laser beam, imprinting a mark, scanning said imprinted mark and comparing said actual laser position for a plurality of positions, storing the results of said plurality of comparing said actual laser positioning steps, repeating said providing an illuminated mark, controlling said laser beam so as to direct an optical path, establishing an actual illuminated mark position and comparing said actual illuminated mark position for a plurality of positions, and storing the results of said plurality of comparing said actual illuminated mark position steps.

12. The method of claim 11 further comprising generating a first function that describes said results of said plurality of comparing said actual illuminated mark position steps, and generating a second function that describes said results of said plurality of comparing said actual laser position steps.

13. The method of claim 12 wherein said laser beam positioning mechanism operates along two perpendicular axes and said first and second functions are each related to differences along said two axes.

14. The method of claim 13 wherein said first function comprises a first illuminated calibration equation, said first illuminated calibration equation indicating the difference between said desired nominal illuminated mark position and said actual illuminated mark position over an entire workpiece region, and said second function comprises a first laser calibration equation, said first laser calibration equation indicating the difference between said desired nominal laser position and said actual laser position throughout said entire workpiece region.

15. A method of calibrating laser trimming apparatus including a laser beam having a first wavelength, a laser beam positioning mechanism, said laser beam positioning mechanism operating along two perpendicular axes, and a detection device using a second wavelength that is different from said first wavelength, the method comprising, controlling said beam positioning mechanism so as to move said laser beam to a desired nominal laser position in a workpiece region, imprinting a mark on a medium with said laser to establish an actual laser position of said laser beam, scanning said imprinted mark with said detection device to determine said actual laser position of said imprinted mark, comparing said imprinted mark of said actual laser position with said desired nominal laser position and producing a result indicative of the difference between said actual laser position and said nominal laser position, providing an illuminated mark at said second wavelength at a desired illuminated mark nominal position in said workpiece region, controlling said laser beam positioning mechanism so as to direct an optical path to said desired illuminated mark nominal position, establishing an actual illumination mark position by directing light from said desired illuminated mark nominal position along said optical path through said laser beam positioning mechanism to said detection device, comparing said actual illuminated mark position with said nominal illuminated mark position, repeating said controlling said laser beam, imprinting a mark, scanning said imprinted mark and comparing said actual laser position for a plurality of positions, storing the results of said plurality of comparing said actual laser position steps, repeating said providing an illuminated mark, controlling said laser beam so as to direct an optical path, establishing an actual illuminated mark position and comparing said actual illuminated mark position for a plurality of positions, storing the results of said plurality of comparing said actual illuminated mark position steps, generating a first function that describes said results of said plurality of comparing said actual illuminated mark position steps, generating a second function that describes said results of said plurality of comparing said actual laser position steps, said first and second functions being each related to differences along said two axes, said first function including a first illuminated calibration equation, said first illuminated calibration equation indicating the difference between said desired nominal illuminated mark position and said actual illuminated mark position over an entire workpiece region, and said second function including a first laser calibration equation, said first laser calibration equation indicating the difference between said desired nominal laser position and said actual laser position throughout said entire workpiece region, providing a desired nominal position to said first function, manipulating said desired nominal position with said first function to provide intermediate position information, providing said intermediate position information to said second function, manipulating said intermediate position information with said second function to provide said actual position information, and providing said actual position information to said beam positioning mechanism, said beam positioning mechanism thereby directing said optical path to said desired nominal position so that the actual laser position equals said desired nominal position.

16. A method of calibrating laser trimming apparatus including a laser beam having a first wavelength, a laser beam positioning mechanism, said laser beam positioning mechanism operating along two perpendicular axes, and a detection device using a second wavelength that is different from said first wavelength, the method comprising, controlling said laser beam positioning mechanism so as to move said laser beam to a desired nominal laser position in a workpiece region, imprinting a mark on a medium with said laser to establish an actual laser position of said laser beam, scanning said imprinted mark with said detection device to determine said actual laser position of said imprinted mark, comparing said imprinted mark of said actual laser position with said desired nominal laser position and producing a result indicative of the difference between said actual laser position and said nominal laser position, providing an illuminated mark at said second wavelength at a desired illuminated mark nominal position in said workpiece region, controlling said laser beam positioning mechanism so as to direct an optical path to said desired illuminated mark nominal position, establishing an actual illuminated mark position by directing light from said desired illuminated mark nominal position along said optical path through said laser beam positioning mechanism to said detection device, comparing said actual illuminated mark position with said nominal illuminated mark position, repeating said controlling said laser beam, imprinting a mark, scanning said imprinted mark and comparing said actual laser position for a plurality of positions, storing the results of said plurality of comparing said actual laser position steps, repeating said providing an illuminated mark, controlling said laser beam so as to direct an optical path, establishing an actual illuminated mark position and comparing said actual illuminated mark position for a plurality of positions, storing the results of said plurality of comparing said actual illuminated mark position steps, generating a first function that describes said results of said plurality of comparing said actual illuminated mark position steps, and generating a second function that describes said results of said plurality of comparing said actual laser position steps, said first and second functions being each related to differences along said two axes, said first function comprising a two-dimensional, third order, least squares fit of said results of said plurality of comparing said actual illuminated mark position steps, and said second function comprising a two-dimensional third order, least squares fit of said results of said plurality of comparing said actual laser position steps.

17. The method of claim 16 wherein
said first illuminated calibration equation and said first laser calibration equation are directed to positions along a first said perpendicular axis,
said first function further comprises a second illuminated calibrator equation, said second illuminated calibrator equation indicating the difference between said desired nominal illuminated mark position and said actual illuminated mark position over an entire said workpiece region, said second illuminated calibration equation being directed to positions along a second said perpendicular axis, and
said second further further comprises a second laser calibration equation, said second laser calibration equation indicating the difference between said desired nominal laser position and said actual laser position throughout said entire workpiece region, said second laser calibration equation being direction to positions along said second perpendicular axis.

18. A laser trimming apparatus comprising
a laser beam source providing a laser beam,
a laser beam positioning mechanism located so as to receive said beam and direct it to a desired position in a workpiece region,
a detection device located to scan said workpiece region and to view a field in said workpiece region, and
a processor including,
   means for controlling said laser beam positioning mechanism to move said laser beam to a desired nominal laser position in a workpiece region,
   means for controlling said laser beam source to imprint a mark on a medium to establish an actual laser position of said laser beam,
   means for controlling said detection device to scan said imprinted mark to determine said actual laser position of said imprinted mark and to determine a mark position within said field,
   means for generating a two-dimensional pixel array related to said field and assigning each pixel of said pixel array an intensity value using information indicating said mark position within said field, and
   means for comparing said imprinted mark of said actual laser position with said desired nominal laser position and producing a result indicative of the difference between said actual laser position and said nominal laser position.

19. The method of claim 6 wherein each of said plurality of controlling steps is related to previous said comparing steps.

20. The method of claim 11 wherein
each of said controlling said laser beam steps is related to previous comparing said actual laser position steps, and
each of said controlling said laser beam positioning mechanism so as to direct an optical path steps is related to previous comparing said actual illuminated mark position steps.

* * * * *

UNITED STATES PATENT AND TRADEMARK OFFICE
CERTIFICATE OF CORRECTION

PATENT NO.   : 4,918,284
DATED        : April 17, 1990
INVENTOR(S)  : John R. Weisz It is certified that error appears in the above-identified patent and that said Letters Patent is hereby corrected as shown below:

Col. 5, line 15; "if" should be --is--;

Col. 5, line 59; "$F_2(y) = C_{21}y^2$" should be --$F_2(y) = C_{21}y$--;

Col. 7, line 10; insert --first-- before "wavelength";

Col. 7, line 65; "including" should be --indicating--;

Col. 11, line 17; "further" after "second" should be --function--.

Signed and Sealed this

Twenty-first Day of January, 1992

Attest:

HARRY F. MANBECK, JR.

Attesting Officer

Commissioner of Patents and Trademarks